United States Patent

Cindrich

[15] 3,646,335

[45] Feb. 29, 1972

[54] RECORDER CORRELATOR USING SCANNING RECORDER DEVICES

[72] Inventor: Ivan Cindrich, Southfield, Mich.

[73] Assignee: The United States of America as represented by the Secretary of the Army

[22] Filed: Feb. 11, 1969

[21] Appl. No.: 798,357

[52] U.S. Cl. ..........................235/181, 350/3.5, 350/162 SF, 313/87, 315/22

[51] Int. Cl. ..........................G06g 7/19, G06g 9/00

[58] Field of Search ..............235/181; 350/3.5, 162 SF, 150, 350/162; 315/21 CH, 21 MR, 22; 313/83, 87

[56] References Cited

UNITED STATES PATENTS

| | | | |
|---|---|---|---|
| 3,127,607 | 3/1964 | Dickey | 235/181 X |
| 3,427,104 | 2/1969 | Blikken et al. | 350/162 X |
| 3,439,155 | 4/1969 | Alexander | 235/181 |
| 3,486,016 | 12/1969 | Faiss | 235/181 |
| 3,492,469 | 1/1970 | Silverman | 235/181 |
| 2,769,116 | 10/1956 | Koda et al | 315/21 |
| 2,986,668 | 5/1961 | Haflinger et al. | 313/83 X |
| 3,189,744 | 6/1965 | Ogland | 313/87 X |
| 3,211,898 | 10/1965 | Fomenko | 235/181 |
| 3,398,269 | 8/1968 | Williams | 235/181 |

OTHER PUBLICATIONS

Weaver et al: A Technique for Optically Coinvolving Two Functions Applied Optics Vol. 5, No. 7 pages 1248- 49 July 1966.

Cindrich: Image Scanning by Rotation of a Hologram Applied Optics Vol. 6, No. 9 Sept. 1967 p. 1531/1534

LaMacchia et al: Coded Multiple Exposure Holograms Applied Optics Vol. 7, No. 1 Jan. 1968 p. 91–94.

*Primary Examiner*—Felix D. Gruber

*Attorney*—Harry M. Saragovitz, Edward J. Kelly, Herbert Berl and Milton W. Lee

[57] ABSTRACT

A technique for simultaneously generating and recording a correlation function by utilizing an intensity modulated beam of light or electrons directed onto a record medium in a scanning format is described and several methods of implementation are given. As the beam scans across any selected spot on the record medium, the correlation function appears in the form of record medium exposure in accordance with the temporal and spatial variations of the beam during its passage over the spot. This concept is described for two-dimensional correlation but can be used for one-dimensional correlation processing in either of the two dimensions available on the record medium.

7 Claims, 3 Drawing Figures

INVENTOR,
IVAN CINDRICH
BY Milton W. Lee AGENT
Harry M. Saragovitz,
Edward J. Kelly &
Herbert Berl ATTORNEYS

RECORDER CORRELATOR USING SCANNING RECORDER DEVICES

BACKGROUND OF THE INVENTION

This invention relates to a technique for correlation processing and more particularly to a technique for simultaneously generating and recording a correlation function on a real time basis.

Both correlation processing and recording on a time-varying basis are each alone well known in the art. Recording alone, of a time-varying input signal, may be accomplished by the recording of a cathode ray tube light beam, a laser light beam or an electron beam on suitable record media, such as photographic film, electrostatic storage tape, charge storage dielectrics or deformable thermoplastics.

A number of analog techniques for correlation processing have been exploited in the prior art with comparatively reasonable success, but in each instance, a two-step process has been necessitated when the correlation function was desired to be recorded for later recall.

SUMMARY OF THE INVENTION

The general purpose of this invention is to provide a technique for simultaneously generating and recording a correlation function in real time on a tape-like form of record medium. To attain this, a controlled flow phenomena was implemented which could be employed with a light beam flow or an electron beam flow.

A beam of electrons with a specified two dimensional current density distribution $h$ is current modulated in accordance with an input signal $s$. The beam is moved in a single line scan across a record media having a superimposed set of coordinate axes $(x,y)$ with a fixed velocity $V_y$ while the film is drawn past this scan line at a fixed velocity $V_x$. The charge accumulated at any particular point $(x',y')$ on the record media is the correlation of $S_n(y)$ with $h(X_n,y)$.

Alternatively, when a laser beam recorder is used the light beam intensity distribution at film plane will be $h(x,y)$ and the modulation of the beam will be in accordance with an input signal $s$. Similarly, the light beam formed from a cathode ray tube is used to implement this concept.

BRIEF DESCRIPTION OF THE DRAWINGS

The exact nature of this invention will be readily apparent from consideration of the following specification relating to the annexed drawings in which.

DESCRIPTION OF THE INVENTION

Figure 1:
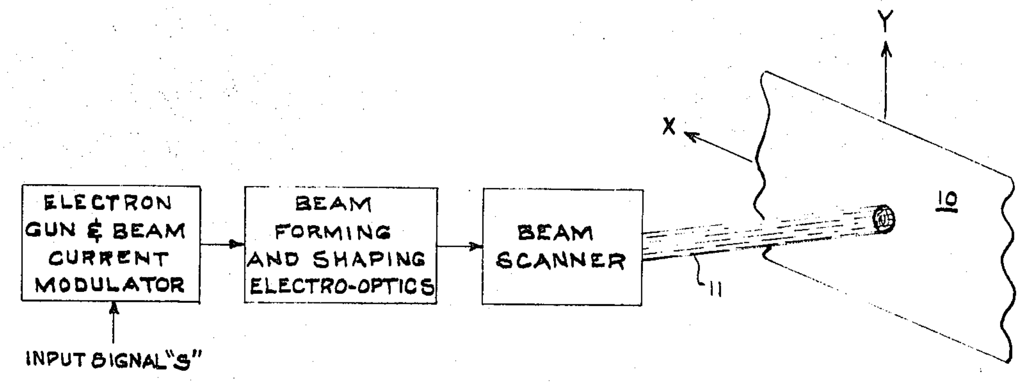
FIG. 1 discloses the inline projection of an electron beam on a recording media with a set of coordinate axes superimposed thereon.

In reference to FIG. 1, the beam intensity distribution at the recording surface 10 is specially shaped for implementation of the desired correlation process, but other than this, conventional linear recording is used. A familiar recorder property is employed to generate the correlation function. This property is the dependence of exposure at any one spot (the accumulated charge or photons) on the temporal and spatial variations of beam during its passage over the spot. The correlation function that is generated appears in the form of record medium exposure and is therefore being recorded as it is generated. The reference function needed for correlation is represented in analog form by the spatial distribution of the beam (flow). The signal to be processed is represented in analog form by total quantity of beam flow (e.g., the temporally modulated beam current of an electron beam or light field power of light beam).

This concept can be envisioned with the aid of a simplified mathematical development of an expression for record medium exposure. Consider the case of recording with an electron beam directly on silver halide film, where exposure can be defined by the density of charge deposited on the film by the writing beam. The theoretical explanation to follow can be developed for the case where a light beam is used to implement the recorder correlator concept. Beam scanning will be assumed across the film width, say the $y$-direction, and the film will be transported in the $x$-direction, normal to the beam path. Beam position, relative to coordinate axes fixed to the film, will be designated by $x$, $y$ and a general point on the film by $x',y'$.

At the film surface the electron beam can be described as the product of two functions, $J(t)$ and $h(x,y)$. Also $J(t)$ defines the temporal variation of beam current, due to being modulated in accordance with the input signal that is normally to be recorded. Furthermore $h(x,y)$ defines the spatial variation of current density through the electron beam cross section at the film surface. Typically $h$ is a bell or gaussian shaped function. It is desired to specify $h$ to have a special shape for the purposes here disclosed, as will be evident later. The expression $J(t)\ h(x,y)$ thus defines the charge per unit time and unit area flowing in the beam at the surface of the film. Film exposure at a point $o,y'$ for a single scan of the electron beam, in terms of the density of charge deposited on the film, is given by the time integral $$\int_{-\infty}^{+\infty} J(t)h(x,y'-y)dt.$$

Infinite limits are used in the integral because $J$ and $h$ are functions of finite extent and thus implicitly establish a limit. With a scan speed $V_y$ the time variable can be restated as $t=y/V_y$ thereby changing the time integral to the form $$\frac{1}{V_y}\int_{-\infty}^{+\infty} J(y/V_y)h(x,y'-y)dy.$$

This expression for exposure is of course the convolution of $J$ with $h$, as a function of $y$. However, we can recognize further that it is the correlation integral for $J$ and $h$ in the variable $y$, when $h$ is a real function. Thus, if the beam distribution, $h$, is shaped to suit one's needs, simultaneous generation and recording of the correlation of $J$ with $h$ in one dimension ($y$) is realized.

Exposure for only a single scan was discussed above and noted to be the basis for a one-dimensional correlator-recorder. Consider now what occurs in the second dimension, $x$. A spot on the film may be exposed to some part of the electron beam during one scan or during several successive scans. The number of scans to which a single spot is exposed can be selected by specification of the $x$-dimension width of the writing beam and the speed $V_x$ at which the film is transported past the beam. We can recognize here again, similar to the $y$-dimension discussion, that the exposure any one spot receives as it passes through the beam in the $x$-direction will vary in accord with beam current variation from scan to scan and the spatial variation of the beam in its $x$-dimension. A spot on the film does not move through the beam in the $x$-direction on a continuous basis because of beam scanning, instead the spot $x$-position, relative to the beam, changes by discrete increments between successive scans. Typically, scan speed is considerably greater than film speed ($V_y>>V_x$) and therefore we can write the expression for exposure at a point $x'y'$ by summing exposures due to individual beam scans, which gives $$\frac{1}{V_y}\sum_n \int_{-\infty}^{+\infty} J\left(\frac{y}{V_y}+nY\right) h(x'-x_n,y'-y)dy.$$

The beam location is given by $x_n$, $y$, where $x_n$ designates position on the $n$-th scan. $Y$ is the scan line length and $n$ an integer designating the $n$-th scan. This summation is a stepwise or discrete form of the convolution of $J$ with $h$, in the $x$-dimension. It may be used as a discrete form of the correlation process to generate the $x$-dimension correlation function of $J$with $h$. It should be noted that for this dimension the incoming signal, $J$, is sampled, once for each scan as indicated by the integer $n$ in its argument, rather than being a continuous quantity as in $y$-dimension correlation. A choice of implementing $x$- or $y$-dimension correlation alone, or both $x$- and $y$-correlation, is possible depending on the design of the spatial distribution function, $h$.

An important consideration in implementing this concept is the buildup of a bias exposure level which is recorded along with the correlation function that is generated. Fortuitously, a bias exposure level is necessary for many types of record media if recording is to be done in the linear region of the response of the medium. A closer look at the correlation integral, with a more detailed expression for $J$ and $h$, will allow analysis which will show how the bias occurs. First we note that the analog being used for the integrand of the correlation integral (beam current) cannot be bipolar, i.e., $J$ and $h$ can take on only positive values. Thus, $J$ must contain a constant (bias) as well as time-varying part.

When both $x$- and $y$-correlation are implemented the bias buildup can limit the allowable dynamic range of the input, $J_1$, since the recorder has a limited range of linear operation. When only one dimensional correlation is implemented the effect of bias buildup on dynamic range will not be a serious consideration.

A special implementation of this concept will be noted herein which the output is presented for direct viewing on a phosphor screen instead of recording on a permanent record medium such as photo film. A key idea here is that the buildup of light emitted by the phosphor after repeated exposure will serve as the integration procedure. Use of a CRT with suitable phosphor persistance and light buildup characteristics can allow direct real time processing and viewing of the resultant two dimensional correlation from the CRT face over a field defined by the line scan length and extent of the uncorrelated signal in the $x$-processing direction. Two additional essential features in such an arrangement would be needed. One would be the use of a stepped or indexed motion of the beam in the $x$-direction after each $y$-sweep. The motion of the beam would be a fast sweep in the $y$-direction then a small step movement in the $x$-direction until the beam is completely stepped through the $x$-dimension extent of the field. The other feature involves the problem of when and for how long a fully correlated field can be made available for viewing. First, it must be noted that the fully correlated field is not available until the beam has completely moved through the field in the $x$-direction. Thus, the persistance of the CRT phase must be as long as the time required to correlate the entire field and then sufficiently longer to allow some reasonable viewing time. The next pass of the beam in the $x$-direction must be held off until sufficient viewing time has elapsed and the screen must be blanked or allowed to decay prior to the start of a new pass. Next it must be noted that for the viewer to avoid being confused or annoyed by the appearance of the scene prior to its being totally correlated, the viewing time after correlation should be long compared to the time to build up the correlated field, or, a masking of the field might be automatically provided for during the correlation buildup time. It should be recognized that the real time correlation and viewing as just described takes place on a sampled basis which will require a compatible combination of the sampling rate and the rate of change of the content of the field being viewed. The phosphor screen itself need not be used directly for viewing. Instead, to increase contrast of the correlated field sample, the phosphor scene may be passed through an appropriate set of lenses and a spatial filter to block out some of the DC component. The light output through this lens system may also be magnified and then projected on an opaque screen for viewing purposes.

Figures 2, 3:
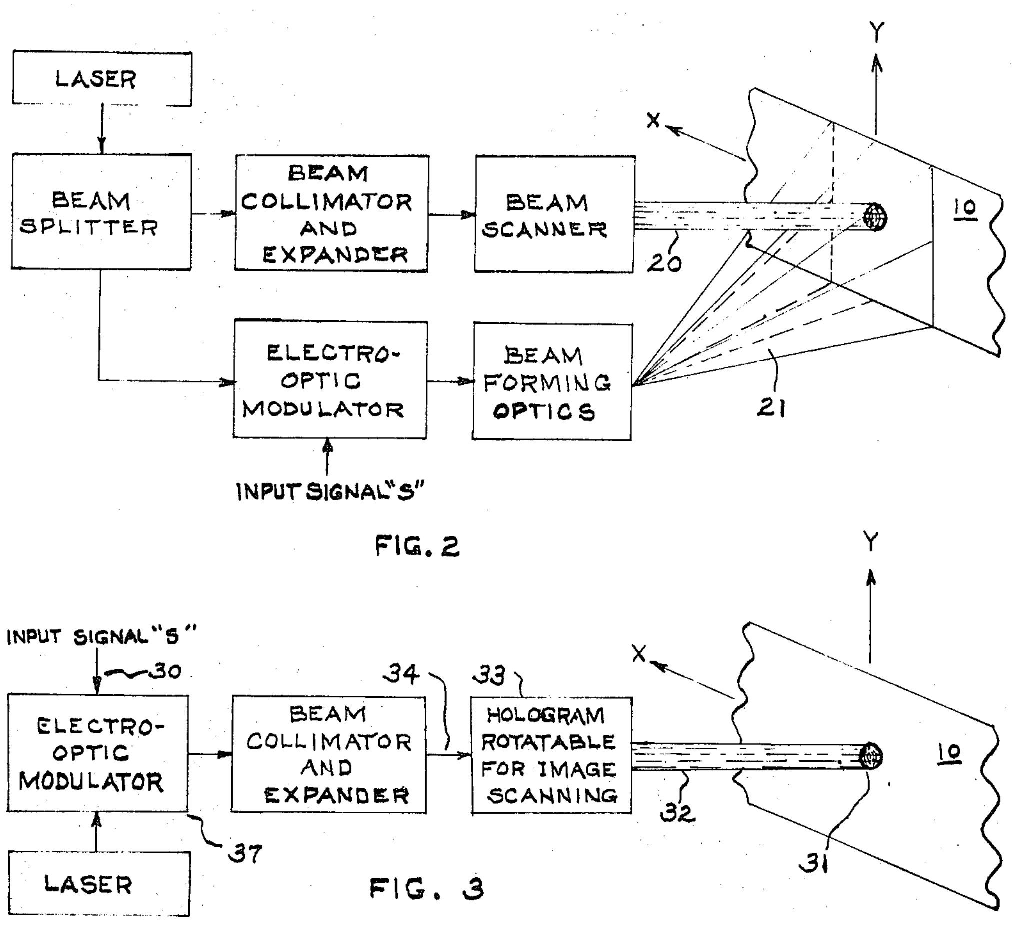
FIG. 2 shows a block diagram of one implementation of the invention in the form of a laser read-in device.
FIG. 3 shows a block diagram of a second implementation of the invention in the form of a Laser read-in device.

As another example of the implementation of the general recorder correlator concept with a laser beam recorder we can use the arrangement of FIG. 2. The laser output is split into two beams (20 and 21) at an appropriate point in the system. These two beams are brought together again later at the record medium surface as shown in FIG. 2. One beam (21) is fixed in position illuminating a comparatively broad area and the field amplitude of this beam is temporally modulated in accord with the input signal $s$ to be correlation processed and recorded. The intensity interference pattern of the two beams coming together at the film surface serves to generate the desired reference function $h(x,y)$ by appropriate choice of the geometric shape of the wave fronts of the two beams 20 and 21 at the record medium surface.

Another example of the implementation of this concept with a laser beam is shown in FIG. 3. Here the desired light beam intensity distribution function $h(x,y)$ is generated in the form of the real image 31 reconstructed from a hologram 33. The method of generation of a two dimensional light distribution function over a surface which is either plane or curved is well known in the optical science of holography. The hologram is furthermore made so that when properly illuminated by the beam 34 and mechanically rotated it serves to scan the real image across the record medium surface. The input signal $s$ 30 to be correlation processed serves to modulate the light beam by use of the electrooptic modulator 37.

Stated in the most general sense the shaping of the beam distribution, for either electron or light beam, may be done with any suitable diffraction or refraction or attenuation device interacting with the beam.

It should be understood that the foregoing disclosure relates to a technique for simultaneously generating and recording a correlation function and no inference has been made as to the preferability of any one particular implementation of the technique over another. Various implementations of the technique are visualized for military, medical and laboratory use, to name a few.

I claim:

1. A technique for simultaneously generating and displaying a correlation function in real time on a display medium, comprising the steps of:
   projecting a beam flow onto a display and storage medium;
   modulating the beam flow in intensity in accordance with an input information signal desired to be correlated;
   shaping the spatial distribution of the beam to be in accordance with a reference function against which the input is to be correlated, such spatial distribution being defined at the surface of the storage medium; and
   scanning the beam across the display and storage medium at a predetermined speed.

2. The technique as set forth in claim 1 wherein the display and storage medium is a record medium and further including the step of advancing the record medium in a direction normal to the scan direction of the beam to provide two-dimensional correlation processing.

3. The technique as set forth in claim 2 wherein the beam-scanning speed of the beam is much greater than the speed of the advancing record medium.

4. The technique as set forth in claim 1, wherein the beam flow is a coherent light beam and the step of projecting the beam onto the display and storage medium includes illuminating a hologram with the modulated light beam whereby the illuminated hologram provides a projected real image at the display medium surface in the form of a shaped light beam intensity distribution, and the step of scanning includes mechanically rotating the hologram to scan the real image across the display medium.

5. The technique as set forth in claim 2, wherein the beam flow is a coherent light beam and the step of projecting the beam onto the record medium includes illuminating a hologram with the modulated light beam whereby the illuminated hologram provides a projected real image at the record medium surface in the form of a shaped light beam intensity distribution, and the step of scanning includes mechanically rotating the hologram to scan the real image across the record medium.

6. The technique as set forth in claim 1 and further comprising the step of moving the scanning beam in a direction normal to the scan direction of the beam in a stepwise manner after each scan to provide two dimensional correlation processing.

7. A technique for simultaneously generating and displaying a correlation function in real time on a display and storage medium, comprising the steps of: splitting a coherent light beam into two separate portions, modulating one portion of the split beam in amplitude in accordance with an input information signal desired to be correlated and subsequently feeding the modulated beam into a beam forming optical system for projecting onto and illuminating in a fixed manner a storage medium; scanning the other portion of the split beam across the illuminated area of the storage medium at a predetermined speed such that the scanning beam is superimposed onto the fixed beam whereby the resultant spatial pattern defined at the storage medium by the interference of the two beam portions is scanned across the storage medium in accordance with the scan of the scanning beam in order to effect the desired spatial pattern that will serve as the reference function in the correlation process; shaping the spatial distribution of the beam in accordance with a reference function against which the input is to be correlated, such spatial distribution being defined at the surface of the storage medium in accordance with the interference of the fixed beam portion and the scanning beam portion.

* * * * *